(12) United States Patent
Lipperheide et al.

(10) Patent No.: US 11,511,601 B2
(45) Date of Patent: Nov. 29, 2022

(54) METHOD AND ASSEMBLY FOR CONTROLLING WATER RECOVERY IN A MOTOR VEHICLE

(71) Applicant: KAUTEX TEXTRON GMBH & CO. KG, Bonn (DE)

(72) Inventors: Moritz Lipperheide, Bonn (DE); Björn Stell, Bergisch Gladbach (DE); Daniel Dreschers, Siegburg (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 17/289,321

(22) PCT Filed: Oct. 14, 2019

(86) PCT No.: PCT/EP2019/077796
§ 371 (c)(1),
(2) Date: Apr. 28, 2021

(87) PCT Pub. No.: WO2020/088924
PCT Pub. Date: May 7, 2020

(65) Prior Publication Data
US 2022/0009313 A1      Jan. 13, 2022

(30) Foreign Application Priority Data
Oct. 31, 2018   (DE) ..................... 10 2018 127 289.8

(51) Int. Cl.
*B60H 1/32* (2006.01)
*E03B 3/28* (2006.01)

(52) U.S. Cl.
CPC ....... *B60H 1/32331* (2019.05); *B60H 1/3233* (2013.01); *E03B 3/28* (2013.01)

(58) Field of Classification Search
CPC ...... B60H 1/32331; B60H 1/3233; E03B 3/28
See application file for complete search history.

(56) References Cited

U.S. PATENT DOCUMENTS

| | | | |
|---|---|---|---|
| 10,328,772 B2 * | 6/2019 | Leone | ..................... B60L 50/15 |
| 2018/0216319 A1 * | 8/2018 | Dudar | ................ B60H 1/32331 |

FOREIGN PATENT DOCUMENTS

| | | |
|---|---|---|
| DE | 102011005595 A1 | 9/2012 |
| DE | 102013110562 A1 | 3/2015 |

(Continued)

OTHER PUBLICATIONS

International Preliminary Report on Patentability dated May 6, 2021 in PCT Application No. PCT/EP2019/077796.

*Primary Examiner* — Lionel Nouketcha
(74) *Attorney, Agent, or Firm* — Occhiuti & Rohlicek LLP (57) ABSTRACT

The invention relates to a method for controlling the recovery of water in a motor vehicle, in which method, to recover water in an air-conditioning system (12) of the motor vehicle, air is cooled to a temperature below its dew point, and the water dropping out as a result of the cooling is collected in a water container (13). During water recovery, the air-conditioning system (12) is controlled by means of a water recovery control device (11), wherein, to control the water recovery by means of the water recovery control device (11), the air-conditioning system (12) is adjusted on the basis of at least one parameter value which is detected by a detection unit (10) and transmitted to the water recovery control device (11).

12 Claims, 4 Drawing Sheets

(56) References Cited

FOREIGN PATENT DOCUMENTS

| | | |
|---|---|---|
| DE | 102014222471 A1 | 5/2016 |
| DE | 102017121740 A1 | 3/2018 |
| DE | 102017121743 A1 | 3/2018 |
| EP | 2607647 A1 | 6/2013 |

* cited by examiner

METHOD AND ASSEMBLY FOR CONTROLLING WATER RECOVERY IN A MOTOR VEHICLE

CROSS-REFERENCE TO RELATED APPLICATIONS

This application is a national phase under 35 U.S.C. 371 of International Application No. PCT/EP2019/077796 filed on Oct. 14, 2019, which claims priority to German Application No. 10 2018 127 289.8 filed on Oct. 31, 2018, the contents of all of which are hereby incorporated by reference in their entireties.

The invention relates to a method for controlling water recovery in a motor vehicle. The invention also relates to an assembly for controlling water recovery in a motor vehicle.

Water consumption in a motor vehicle is steadily increasing due to new technologies in the motor vehicles such as water injection systems, or also due to the use of sensors for autonomous driving functions, which must be continuously cleaned for error-free operation. Furthermore, the comfort of a user of the vehicle can also be increased by the availability of service and/or drinking water in the motor vehicle. In order to be able to compensate for the resulting increased water consumption, increasingly large water containers are being installed in motor vehicles. However, these containers require a large amount of space and increase the overall weight of the motor vehicle.

In order to be able, in particular, to reduce the space required for the water containers and the weight resulting from the water containers while also avoiding having to frequently refill the water, it is also possible to generate water, in particular service and/or drinking water, from the air. For this purpose, the (moist) air in an air-conditioning system of the motor vehicle is cooled below its dew point so that water precipitates and can be collected in one or more water containers in the motor vehicle. As a result, water can be recovered continuously so that the amount of water to be held available in the water container can be reduced, and thus the size and thereby also the weight of the water container can be reduced.

In contrast to stationary water recovery, however, water recovery in a moving motor vehicle is considerably more complex since many boundary conditions have to be taken into account.

The invention is based on the object of providing a method and an assembly for controlling water recovery in a motor vehicle which are characterized by an improved mode of operation.

The object according to the invention is achieved by the features of the independent claims. Advantageous embodiments and developments are specified in the dependent claims.

According to the method according to the invention, to recover water in an air-conditioning system of the motor vehicle, air is cooled to a temperature below its dew point, and the water precipitating as a result of the cooling is collected in a water container, wherein, during water recovery, the air-conditioning system is controlled by a water-recovery control device, i.e., a water-recovery controller, that adjusts the air-conditioning system on the basis of at least one parameter value, which is detected by a detection unit and transmitted to the water-recovery control device.

The method is characterized in that the water recovery in a motor vehicle now takes place in such a way that the air-conditioning system can be actively controlled and regulated by means of the water recovery control device in order to be able to achieve the most effective water recovery possible. The active control or regulation is performed by means of one or more parameter values which are stored in a detection unit and transmitted to the water recovery control device. The detection unit detects the respective parameter values beforehand, it preferably being possible to update the parameter values continuously and to forward said values to the water recovery control device in an updated manner. The control of the water recovery can be adapted to the existing ambient conditions at any time. The at least one parameter value is preferably a parameter value that reflects the ambient conditions of the motor vehicle. If a plurality of parameter values is used, different ambient conditions can be taken into account for controlling the water recovery. A characteristic map can be impressed on the control of the water recovery and thus the water recovery control device by means of parameter values, so that the air-conditioning system can be adjusted in accordance with the prevailing ambient conditions in such a way that a maximum amount of water can be recovered. When adjusting the air-conditioning system, air-conditioning system target values can be adjusted, for example. Air-conditioning system target values can be formed, for example, from a fan output or a compressor output.

An ambient climate of the motor vehicle detected by the detection unit can, for example, be used as the parameter value. The ambient climate can be formed, for example, from an ambient temperature and/or an ambient air humidity and/or an ambient air pressure. The parameter value can then be, for example, an ambient parameter value. The ambient parameter value can then be, for example, an ambient temperature value and/or an ambient air humidity value and/or an ambient air pressure value.

It is also possible to use a vehicle data set detected by the detection unit as the parameter value. This means that data from the motor vehicle itself can also be used or taken into account for controlling the water recovery. The water recovery can thus be controlled in an even more individualized manner that is adapted to certain situations.

The vehicle data set can, for example, be selected from one or more of the following data: navigation data and/or weather forecast data and/or data about a water level in the water container. Other data are conceivable as well. The location of the motor vehicle, for example, can be determined by using navigation data. Furthermore, the planned route of the motor vehicle can be determined from navigation data. From the location and/or the route, conclusions can be drawn, for example, about the climatic ambient conditions, road conditions, the duration of the trip, etc. The navigation data can be transmitted from a navigation device of the motor vehicle to the detection unit and stored therein such that the water recovery control device can retrieve said data. Weather forecast data can be checked, for example, via an Internet connection in the motor vehicle. Weather forecast data can be used to make a statement about sunny or rainy conditions and thus about expected ambient temperatures and/or expected air humidity data at various points along the planned route of the motor vehicle. This data can also be transmitted to the detection unit and stored such that the water recovery control device can retrieve said data at any time. Another vehicle data set can be a water level in the water container into which the collected water is directed. The water recovery can also be controlled on the basis of the water level, since a larger or a smaller amount of water can be recovered on the basis of the water level such that water can be recovered as needed.

Furthermore, the detection unit can measure an actual water level in the water container and compare the measured actual water level to a target water level. By measuring the actual water level and comparing it to a previously defined target water level, it is possible to determine how high the demand for water to be collected is by determining the difference between the actual water level and the target water level.

The need for water to be collected can vary depending on the planned route of the motor vehicle. Therefore, a change in the actual water level can preferably be determined on the basis of a driving distance of the motor vehicle. If, for example, a certain target water level is specified that should be maintained at all times, it is possible to determine how much water has to be generated at what point in time in order not to fall below, or at least not permanently fall below, the target water level in the water container. Furthermore, an expected water level development over the planned route of the motor vehicle can be determined to make the control of the water level extremely predictive. This makes it possible to control the water recovery in a very precise manner.

The actual water level can be measured before and/or during a journey of the motor vehicle. For example, as soon as a planned driving distance is known, for example because it is entered into a navigation device, the actual water level can be measured, and therefore the actual water level can be measured even before the start of the journey of the motor vehicle. During the trip, the actual water level can be measured repeatedly, which means that the actual water level can be measured continuously until the end of the trip, which means that water can be recovered as needed.

It is also possible for the detection unit to be synchronized with a calendar of the driver of the motor vehicle. The synchronization makes it possible to determine planned driving routes or driving distances in advance by using the appointments noted in the calendar, and, in order to control the water recovery in an even more precise manner, the water requirement can be determined on the basis of the planned driving route even hours or days before the trip. The detection unit can use the navigation device of the motor vehicle to determine a current position of the location and/or a starting position of the motor vehicle noted in the calendar, and the detection unit can use the navigation device to determine the driving route to be taken in order to arrive at the location noted in the calendar for the corresponding appointment on the basis of the current position of the location of the motor vehicle and/or by using the starting position noted in the calendar. On the basis of the planned driving route determined therefrom, the required amount of water to be collected can then be recovered very early on, several hours or several days before the start of the corresponding trip, which means that the control of the water recovery can be adjusted very early on.

Target values for water recovery per time and/or target values for water recovery per electrical output and/or target values for water recovery per mechanical output of the air-conditioning system can be stored in the water recovery control device. The target values preferably define the required amount of water to be collected on the basis of a certain time or duration and/or on the basis of an electrical output to be generated by the motor vehicle during the journey, in particular by electrical consumers of the motor vehicle such as the air-conditioning system. The mechanical output can result from a belt drive of the air-conditioning system, for example. From these target values, particularly optimized characteristic maps can be determined which can be impressed on the water recovery control device in order to control the water recovery as efficiently as possible.

The target values for the water recovery per time and/or the target values for the water recovery per electrical output and/or the target values for the water recovery per mechanical output can be determined experimentally and/or calculated from simulation data from the air-conditioning system.

The water recovery control device can work independently and thus perform separate control of the air-conditioning system. However, it is also possible that the water recovery control device interacts with an air-conditioning control device, i.e., an air-conditioning controller, and that the water recovery control device is regulated on the basis of the air-conditioning system parameters detected in the air-conditioning control device. If the water recovery control device interacts with the air-conditioning control device, air-conditioning system parameters can also be taken into account for the water recovery control so that the water recovery can be controlled even more individually and more precisely. The parameter values for adjusting the air-conditioning system, which values are detected by the detection unit and determined by the water recovery control device, can then preferably be compared and/or synchronized with the air-conditioning system parameters so that the parameter values can be coordinated on the basis of the air-conditioning system parameters.

The air-conditioning system parameters can be selected, for example, from at least one of the following data: minimum air-conditioning system temperature and/or maximum air-conditioning system temperature and/or minimum air outlet velocity and/or maximum air outlet velocity. This data can have an influence on the comfort experienced by the occupants of the motor vehicle, and therefore these air-conditioning system parameters should preferably only be adjusted within certain limits when the air-conditioning system is adjusted by the water recovery control device in order to control the water recovery.

Therefore, the air-conditioning system parameters can preferably be selected on the basis of a comfort setting of a vehicle occupant of the motor vehicle. A comfort setting of a vehicle occupant is preferably a customized setting that the vehicle occupant perceives as particularly comfortable, for example in that the interior temperature and/or the air outlet velocity are perceived by the vehicle occupant as comfortable.

For example, the minimum and/or maximum air-conditioning system temperature is preferably selected in a range of +/−8 Kelvin with respect to an actual interior temperature. Furthermore, the minimum and/or maximum air outlet velocity of the air exiting from the air-conditioning system into the interior of the motor vehicle can preferably be selected such that the air outlet velocity does not exceed a value of 0.15 m/s and does not fall below a value of 0.05 m/s.

The object according to the invention is furthermore achieved by means of an assembly for controlling water recovery in a motor vehicle, which assembly comprises an air-conditioning system by means of which air can be cooled to a temperature below its dew point, a water container in which the water precipitating as a result of the cooling can be collected, a detection unit in which at least one parameter value is detected, and a water recovery control device to which the at least one parameter value detected in the detection unit can be transmitted and by means of which the air-conditioning system can be adjusted to control the water recovery on the basis of the at least one transmitted parameter value.

With regard to the advantages and further embodiments of the device, reference is made to the previously described method for controlling water recovery.

The invention is explained in greater detail in the following with reference to the accompanying drawings using preferred embodiments.

IN THE DRAWINGS

Figure 1:
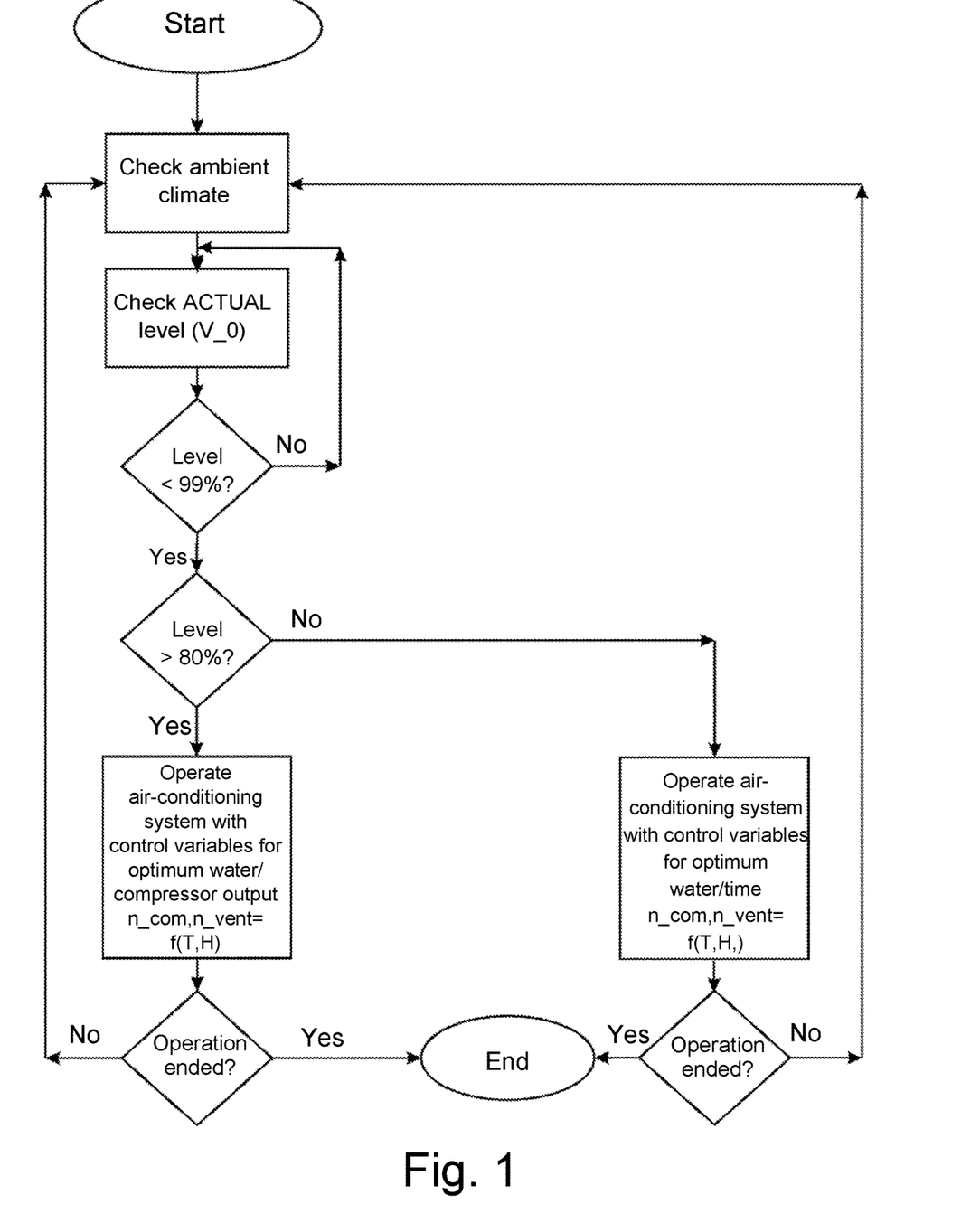
FIG. 1 is a schematic representation of a sequence of a method according to the invention for controlling water recovery in a motor vehicle.

FIG. 1 is a schematic representation of a sequence of the method according to the invention for controlling water recovery in a motor vehicle.

At the start of the trip of the motor vehicle, a first parameter value and/or a plurality of parameter values are first detected by a detection unit 10, and, in the embodiment shown here, the ambient climate of the motor vehicle is checked. The ambient temperature T and/or the ambient air humidity H can be checked in this context, for example. The check can be performed, for example, by sensors in the motor vehicle.

After one or more parameter values have been determined by checking the ambient climate, an actual water level of the water contained in a water container 13 is checked. If the actual water level is greater than a previously defined target water level, expressed here by the check "level<99%," a new check is performed until the actual water level becomes less than a previously defined target water level as a result of the consumption of water by the motor vehicle.

It can be stipulated in this regard that when a certain difference is reached between the target water level and the actual water level, here "level>80%," the water recovery is controlled on the basis of target values for water recovery per time or on the basis of target values for water recovery per electrical output.

If the actual water level is >80%, the water recovery is controlled on the basis of target values for water recovery per electrical output of the air-conditioning system 12, wherein the compressor output of the air-conditioning system 12 is used for the target values of the electrical output. To achieve corresponding control of the water recovery, a characteristic map for water recovery per electrical output is impressed on the water recovery control device 11 on the basis of the previously determined parameter values using the detected ambient climate. Alternatively or additionally, it is also possible for the water recovery to be controlled on the basis of target values for water recovery per mechanical output of the air-conditioning system 12.

If the actual water level is <80%, the water recovery is controlled on the basis of target values for water recovery per time. According to the previously determined parameter values using the detected ambient climate, a setting of the air-conditioning system or the air-conditioning system target values can then be selected in such a way that water recovery per time can be maximized.

According to the data that is determined, the air-conditioning system 12 can be controlled accordingly by means of the water recovery control device 11 to recover water.

If the trip of the motor vehicle ends, the control of the water recovery ends as well. The control of the water recovery and thus the water recovery itself can also be continued after the end of the trip if, for example, there is sufficient residual energy in the vehicle's energy storage, or if the vehicle is connected to a charging station by means of a charging plug and the vehicle is being electrically charged.

If the trip has not yet ended, the method sequence is repeated so that the parameter values for adjusting the air-conditioning system for the water recovery are continuously adapted and updated.

Figure 2:
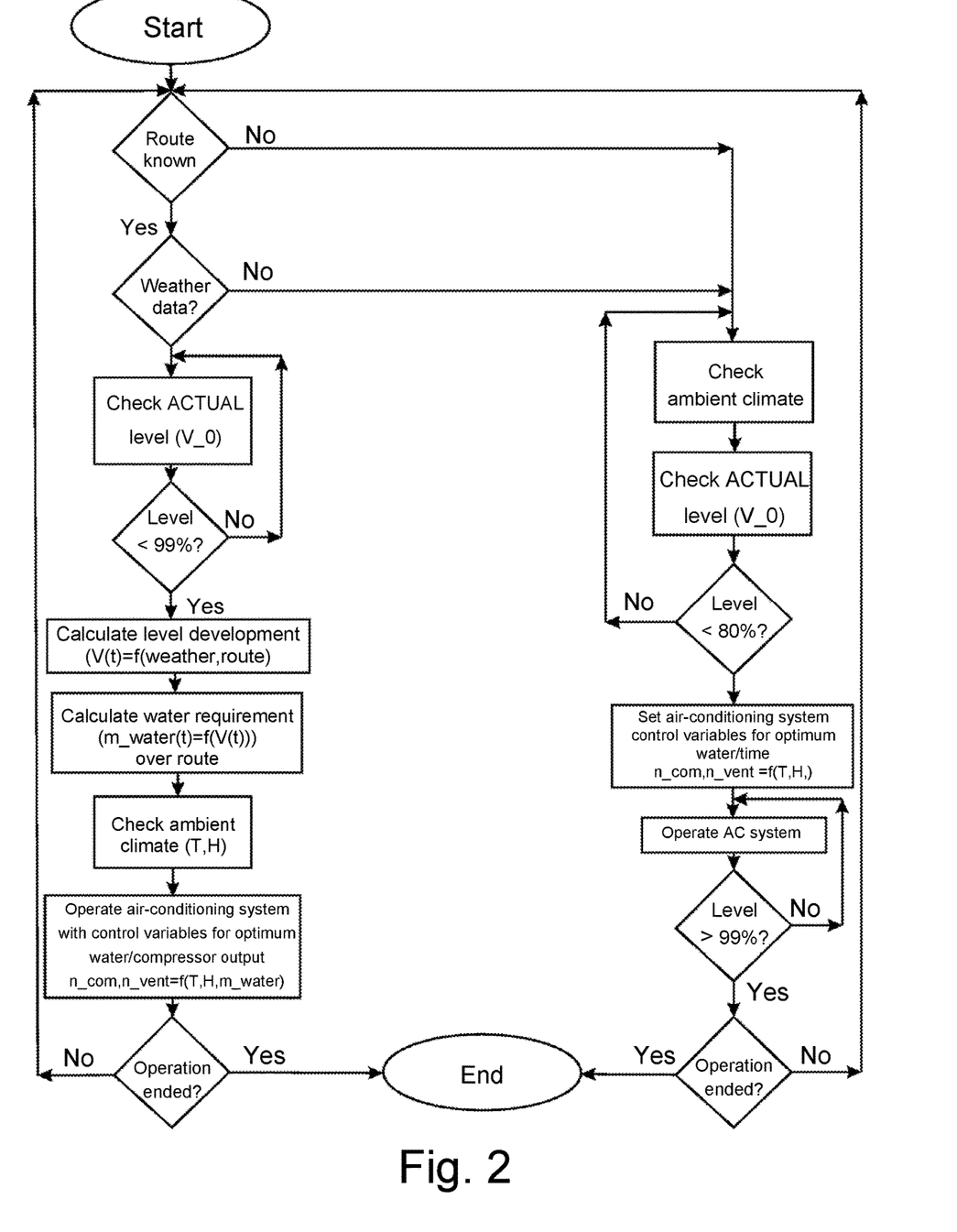
FIG. 2 is a schematic representation of a sequence of the method for controlling water recovery in a motor vehicle according to a further embodiment.

FIG. 2 shows an embodiment for a sequence of the method according to the invention in which navigation data and weather data or weather forecast data are also taken into account as parameter values.

In this case, navigation data is first checked by asking whether the route or driving distance of the motor vehicle is known.

If the route is known, weather data or weather forecast data are checked for the corresponding route.

If weather data or weather forecast data are available, the actual water level in the water container 13 is then checked.

If the actual water level falls below a previously defined target water level, in this case when the level is <99%, an expected water level development is calculated on the basis of the previously determined weather data or weather forecast data and/or the previously determined navigation data.

The amount of water required for the route can then be calculated on the basis of the calculated water level development.

The actual ambient climate can then be checked in order to determine further parameter values for adjusting the air-conditioning system.

On the basis of all this data and these parameter values, the air-conditioning system can be controlled by means of the water recovery control device as needed. In this regard, a characteristic map comprising target values for the water recovery per electrical output of the air-conditioning system can be impressed on the water recovery control device.

If there is no weather data or weather forecast data that can be used as parameter values, the ambient climate is checked in order to be able to use parameter values based on the ambient climate when controlling the water recovery.

The actual water level is then checked. If the actual water level is below the previously defined target water level, in this case at a level <80%, the air-conditioning system is adjusted, and the air-conditioning system 12 is controlled, for water recovery, on the basis of the determined parameter values of the ambient climate and a characteristic map for water recovery per time impressed on the water recovery control device 11.

Then, the operation of the air-conditioning system 12 is examined and the actual water level checked. If the actual water level is equal to or greater than the target water level ("level >99%"), the method is repeated until the journey of the motor vehicle has ended.

Figure 3:
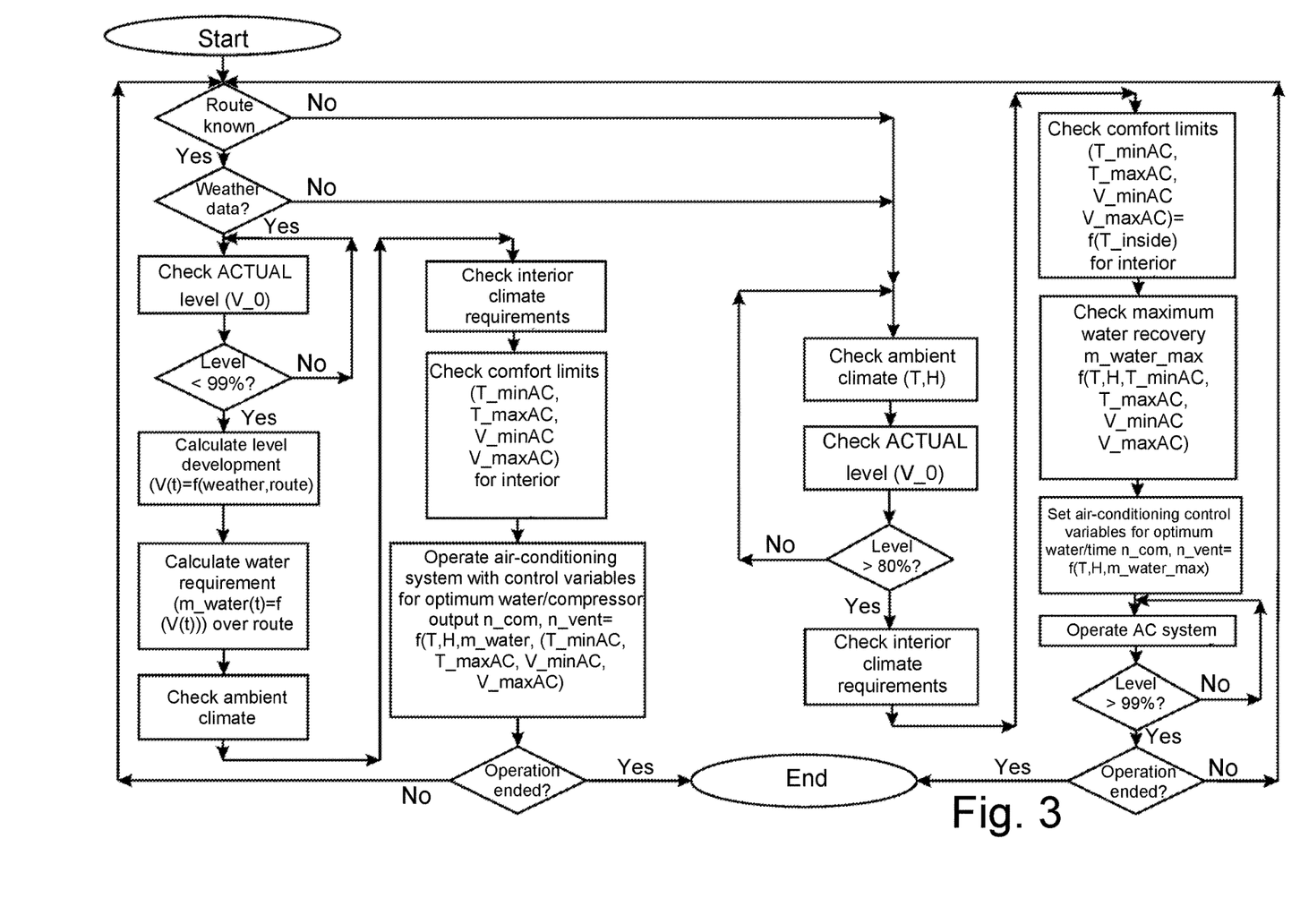
FIG. 3 is a schematic representation of a sequence of the method for controlling water recovery in a motor vehicle according to a further embodiment.

FIG. 3 shows an embodiment for a sequence of the method according to the invention, in which the water recovery control device 11 interacts with an air-conditioning control device 14, and the water recovery control device 11 is regulated on the basis of air-conditioning system parameters detected in the air-conditioning control device 14.

In this case too, in order to determine parameter values for adjusting the air-conditioning system 12 to control the water recovery, navigation data is checked by checking "route known", and weather data or weather forecast data is checked.

If both navigation data and weather data are available for use as parameter values, the actual water level is checked first.

If this level is below a previously defined target water level, the navigation data and the weather data or weather forecast data are used to calculate the level development during the planned route of the motor vehicle to be travelled, by determining a change in the actual water level based on the driving distance of the motor vehicle.

The amount of water required along the planned route or the planned driving distance can be calculated on the basis of the calculated level development.

The actual ambient climate can then be checked in order to determine further parameter values for adjusting the air-conditioning system.

Air-conditioning system parameters are checked thereafter.

First, the air-conditioning requirements, i.e. the desired climate in the interior of the motor vehicle, are checked. The minimum air-conditioning system temperature T_minAC, the maximum air-conditioning system temperature T_maxAC, the minimum air outlet velocity V_minAC and/or the maximum air outlet velocity V_maxAC can be determined in order to check the comfort limits for the occupants of the interior of the motor vehicle.

On the basis of all this data and these parameter values, the air-conditioning system can be controlled as needed by means of the water recovery control device and likewise by means of the air-conditioning control device in order to achieve optimum water recovery. In this regard, a characteristic map comprising target values for the water recovery per electrical output of the air-conditioning system can be impressed on the water recovery control device.

If no navigation data, weather data or weather forecast data are available as parameter values, the ambient climate is first checked in order to be able to use parameter values based on the ambient climate when controlling the water recovery.

The actual water level is then checked. If the actual water level is below the previously defined target water level, in this case at a level <80%, air-conditioning system parameters are checked. First, air-conditioning requirements, i.e. the desired climate in the interior of the motor vehicle, are checked. The minimum air-conditioning system temperature T_minAC, the maximum air-conditioning system temperature T_maxAC, the minimum air outlet velocity V_minAC and/or the maximum air outlet velocity V_maxAC can be determined in order to check the comfort limits for the occupants of the interior of the motor vehicle.

Depending on the determined parameter values of the water recovery control device 11, such as data on the ambient climate, in particular the ambient temperature T and the ambient air humidity H, and depending on the determined air-conditioning system parameters such as the minimum air-conditioning system temperature T_minAC, the maximum air-conditioning system temperature T_maxAC, the minimum air outlet velocity V_minAC and/or the maximum air outlet velocity V_maxAC, the maximum possible amount of water to be recovered can be determined.

The air-conditioning system 12 is then adjusted, and the air-conditioning system 12 is controlled for water recovery on the basis of the determined parameter values T, H of the ambient climate and a characteristic map for water recovery per time impressed on the water recovery control device 11.

Then, the operation of the air-conditioning system 12 is examined and the actual water level checked. If the actual water level is equal to or greater than the target water level ("level 99%"), the method is repeated until the journey of the motor vehicle has ended.

Figure 4:
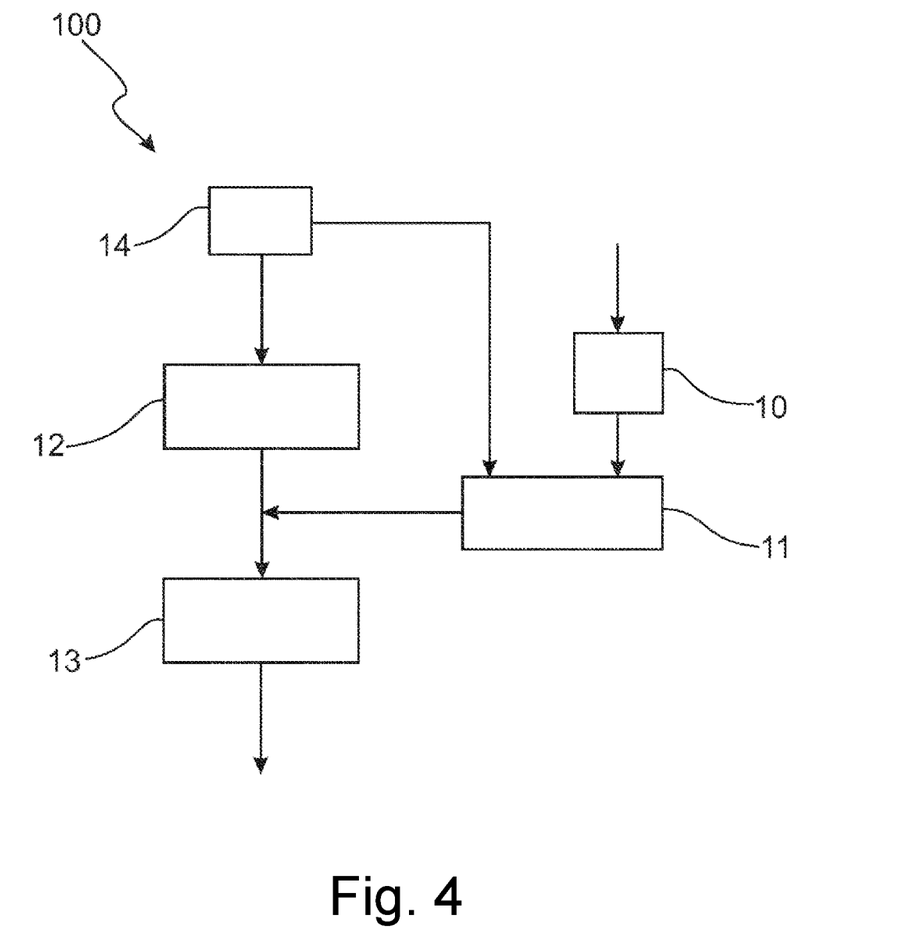
FIG. 4 is a schematic representation of an assembly for controlling water recovery in a motor vehicle.

FIG. 4 is a schematic representation of an assembly 100 for controlling water recovery in a motor vehicle.

The assembly 100 comprises an air-conditioning system 12 of the motor vehicle, by means of which system air, for example ambient air, is cooled to a temperature below its dew point in order to recover water. When the air is cooled, water precipitates which can be collected in a water container 13. From this water container 13, the water can then be passed on to various stations and other water containers within the motor vehicle.

During the water recovery, the air-conditioning system 12 is controlled by means of a water recovery control device 11 in order to be able to achieve the best possible water output. The control by means of the water recovery control device 11 is carried out by means of one or more parameter values which can be determined, for example, from the ambient climate around the motor vehicle and/or from a vehicle data set of the motor vehicle. To detect these parameter values, a detection unit 10 is provided which stores the detected parameter values and forwards them to the water recovery control device 11.

Based on these parameter values and, if necessary, further data and/or parameters, the water recovery can be actively controlled in a manner that is adapted to the ambient conditions of the motor vehicle.

LIST OF REFERENCE SIGNS

100 Assembly
10 Detection unit
11 Water recovery control device
12 Air-conditioning system
13 Water container
14 Air-conditioning control device
T Ambient temperature
H Ambient air humidity
T_minAC Minimum air-conditioning system temperature
T_maxAC Maximum air-conditioning system temperature
V_minAC Minimum air outlet velocity
V_maxAC Maximum air outlet velocity

The invention claimed is:

1. A method for controlling water recovery in a motor vehicle, in which method,
to recover water in an air-conditioning system of the motor vehicle, air is cooled to a temperature below its dew point and the water precipitating as a result of the cooling is collected in a water container,
wherein, during water recovery, the air-conditioning system is controlled by means of a water-recovery controller,
wherein, to control the water recovery by means of the water-recovery controller, the air-conditioning system is adjusted on the basis of at least one detected parameter value that is transmitted to the water-recovery controller,
wherein target values for water recovery per electrical output and/or target values for water recovery per mechanical output of the air-conditioning system are stored in the water-recovery controller, and
wherein water recovery is controlled on the basis of said target values.

2. The method according to claim 1, characterized in that an ambient climate of the motor vehicle is used as the parameter value.

3. The method according to claim 1, characterized in that a vehicle data set is used as the parameter value.

4. The method according to claim 3, characterized in that the vehicle data set is selected from one or more of the following data:

navigation data and/or weather forecast data and/or data about a water level in the water container.

5. The method according to claim 1, characterized in that an actual water level in the water container is measured and compared to a target water level.

6. The method according to claim 5, characterized in that a change in the actual water level is determined on the basis of a driving distance of the motor vehicle.

7. The method according to claim 5, characterized in that the actual water level is measured before and/or during a journey of the motor vehicle.

8. The method according to claim 1, characterized in that the target values for the water recovery per time and/or the target values for the water recovery per electrical output and/or the target values for the water recovery per mechanical output are determined experimentally and/or calculated from simulation data from the air-conditioning system.

9. The method according to claim 1, characterized in that the water-recovery controller interacts with an air-conditioning controller and the water-recovery device is regulated on the basis of air-conditioning system parameters detected in the air-conditioning controller.

10. The method according to claim 9, characterized in that the air-conditioning system parameters are selected from at least one of the following data: minimum air-conditioning system temperature ($T\_minAC$) and/or maximum air-conditioning system temperature ($T\_maxAC$) and/or minimum air outlet velocity ($V\_minAC$) and/or maximum air outlet velocity ($V\_maxAC$).

11. The method according to claim 9, characterized in that the air-conditioning system parameters are selected on the basis of a comfort setting of a vehicle occupant of the motor vehicle.

12. An assembly for controlling water recovery in a motor vehicle, comprising an air-conditioning system by means of which, to recover water, air can be cooled to a temperature below its dew point, a water container in which the water that precipitates as a result of the cooling can be collected, and a water-recovery controller, wherein the assembly is configured to recover water in the air-conditioning system of the motor vehicle by cooling air to a temperature below its dew point and collecting the water precipitating as a result of the cooling in the water container, wherein, during water recovery, the air-conditioning system is controlled by means of the water-recovery controller, wherein, to control the water recovery by means of the water-recovery controller, the air-conditioning system is adjusted on the basis of at least one parameter value that is transmitted to the water-recovery controller, wherein target values for water recovery per electrical output and/or target values for water recovery per mechanical output of the air-conditioning system are stored in the water-recovery controller, and wherein water recovery is controlled on the basis of said target values.

* * * * *